July 30, 1935.  A. F. SCHWENDNER  2,009,418

BACK PRESSURE CONTROL MECHANISM

Filed June 7, 1934  2 Sheets-Sheet 1

INVENTOR
ANTHONY F. SCHWENDNER

BY  A. B. Ravis
ATTORNEY

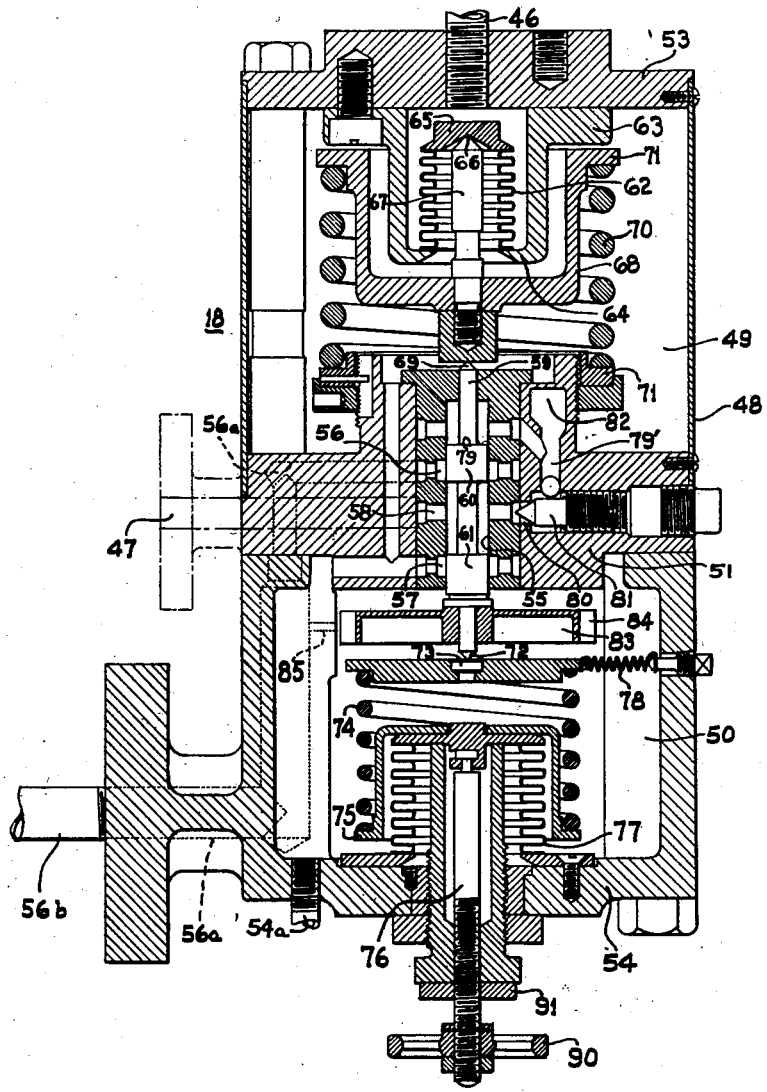
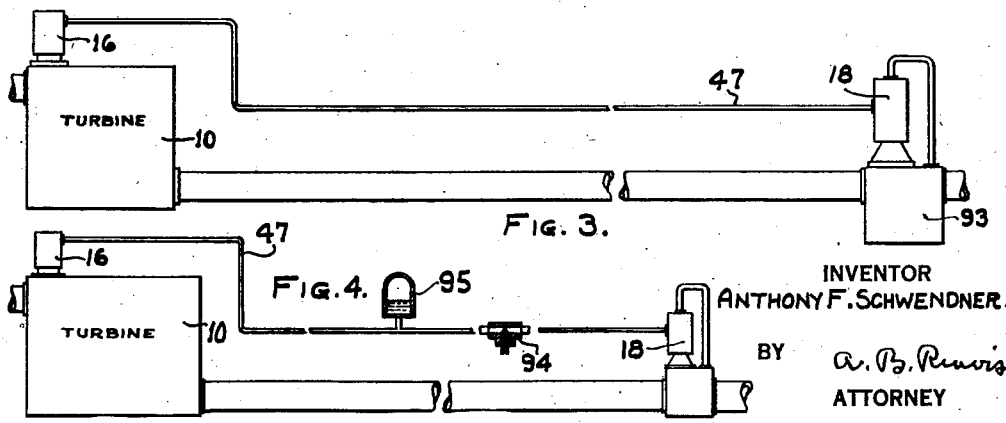
FIG. 2.
FIG. 3.
FIG. 4.
INVENTOR
ANTHONY F. SCHWENDNER.
BY
ATTORNEY Patented July 30, 1935

2,009,418

UNITED STATES PATENT OFFICE 2,009,418

BACK PRESSURE CONTROL MECHANISM

Anthony F. Schwendner, Essington, Pa., assignor to Westinghouse Electric & Manufacturing Company, East Pittsburgh, Pa., a corporation of Pennsylvania Application June 7, 1934, Serial No. 729,371

23 Claims. (Cl. 60—64)

My invention relates to back pressure regulators and it has for an object to provide highly sensitive apparatus of this character.

It is a more particular object of my invention to provide a back pressure regulator of the pressure transformer type wherein back pressure is utilized as a primary pressure medium to bring about the development of a secondary fluid pressure having a predetermined relation with respect to the primary fluid pressure; the secondary fluid pressure being supplied to suitable governing mechanism to control the admission of motive fluid to a prime mover.

A further object of my invention is to provide a back pressure regulator functioning to maintain a substantially constant back pressure, or a back pressure varying within narrow limits, in a line or passage supplied by a steam turbine, the regulator reacting on the turbine governor so as to control the steam admission valve so as to admit steam suitably for this purpose, the back pressure regulator being of the transformer type wherein back pressure of steam is utilized as a primary pressure to secure a secondary or transformed pressure of fluid bearing a predetermined relation with respect to the primary pressure and which is applied to the turbine governor so as to control the admission of steam to the turbine so as to maintain a predetermined back pressure within very narrow limits.

A further object of my invention is to provide a back-pressure regulator capable of being adjusted to secure testing of the emergency governor.

A further object of my invention is to provide a turbine having a governing system of the pressure transformer type together with a back pressure regulator constructed and arranged to apply pressure to the transformer governing system so that the latter is rendered effective to control the admission of steam to the turbine to meet both load and steam consuming device demands.

These and other objects are effected by my invention as will be apparent from the following description and claims taken in connection with the accompanying drawings forming a part of this application, in which:

Fig. 2 is an enlarged sectional view of the back pressure regulator;

Fig. 3 is a diagrammatic view showing the steam consuming device located at a distance from the turbine; and Fig. 4 shows a further arrangement of my invention.

Figure 1:
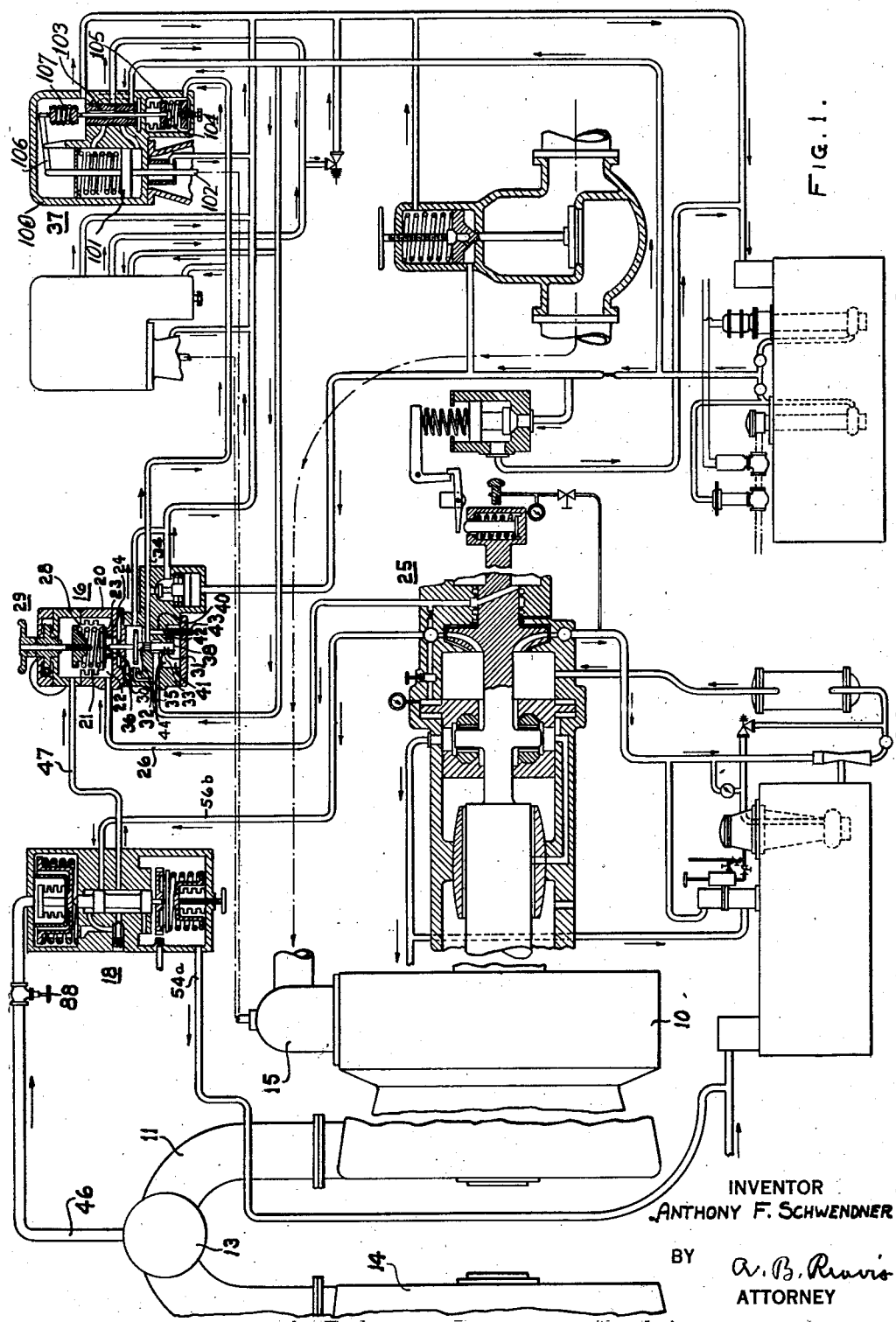
Fig. 1 is a diagrammatic view of a turbine plant having my improved back pressure regulator applied thereto.

Referring now to the drawings more in detail, I show a turbine power plant including, for example, a high pressure turbine 10 exhausting through a connection 11 to any suitable device, for example, the back pressure manifold or supply connection 13, which may, for example, supply steam to any suitable consuming devices, one of which may be the low-pressure turbine 14. The present invention relates to means responsive to change in back pressure to control the admission of steam to the high-pressure turbine in such a way that, irrespective of change in demand for back pressure steam for heating or other purposes, the pressure thereof will be maintained within very narrow limits. Maintenance of the back pressure within narrow limits is desirable in all cases and it is essential where the temperature of the heating load must be maintained within narrow limits.

It will be apparent that the showing of high and low pressure turbines 10 and 14 is merely for illustrative purposes, for it is obvious that the regulating mechanism may be associated with any type of steam pressure line to control the admission means of the source supplying the line, for example, it may be applied to a bleeder line, to the exhaust end of a back pressure turbine or engine to the cross-over connection between high and low pressure units, or to the outlet or discharge of any suitable pressure reducing means. Also, as hereinafter pointed out, the control device is advantageous where associated with a consumer located a considerable distance from the steam source, for example, the exhaust end of the high-pressure turbine 10.

The turbine 10 is provided with a governor valve 15 which is controlled by a transformer governor, at 16, in the manner more particularly described in my application Serial No. 729,370, filed June 7, 1934. My improved back-pressure regulator, at 18, is responsive to the back pressure of steam supplied from the turbine 10 and it exerts its effect on the transformer governor, at 16, so as to control the admission of steam to the turbine 10 to maintain back pressure of steam leaving the latter substantially constant or within very narrow limits of variation even though the requirements for steam for heating and like purposes may vary widely.

In order that the back pressure regulator may be more clearly understood, brief reference will be made to the transformer governor, at 16. The governor includes a housing structure 20 containing the sylphon 21 arranged in the chamber 22, the upper end of the sylphon being attached to the housing structure and the lower end thereof being closed by a suitable abutment element 23 which provides the primary piston area 24.

Fluid under pressure is supplied from suitable impeller apparatus, at 25, by means of a passage 26 to the primary pressure chamber 22 for action on the primary piston area 24. The force of fluid under primary pressure acting on the primary piston area is opposed by a suitable spring 28, whose force may be adjusted by speed changer apparatus indicated generally, at 29.

The abutment means 23 has a point bearing connection, at 30, with respect to the upper end of the piston valve 31, the latter having piston portions 32 and 33 normally interrupting communication of the secondary pressure supply connection 34, with the pressure supply connection 35 or with the drain or exhaust space 36. The passage 34 supplies fluid under secondary pressure to servo-motor apparatus, at 37, for operating the admission valve means 15.

In addition to the opposed spring and primary fluid pressure forces acting on the abutment 23, fluid under pressure is supplied from the secondary pressure passage for action on the secondary piston face or area 38, the latter piston face area facing in the same direction as the primary piston face area, so that the position of the piston valve is determined by the two upwardly acting fluid pressure forces and the one downwardly acting spring force.

From the structure described, it will be apparent that, with increase in impeller pressure, or of the primary fluid pressure force, the abutment 23 will move upwardly against the force of the spring 28. Immediately as this occurs, the piston valve 31 moves upwardly because of fluid under pressure supplied to the secondary piston area or face 38 from the secondary fluid pressure line 34; and this upward movement of the piston valve 31 places the secondary pressure line 34 in communication with the exhaust space 36 with the result that the secondary pressure is reduced, this reduction continuing until the force of the secondary pressure acting on the piston valve 31 through the secondary piston face or area 38 is sufficiently reduced to compensate for the increased primary fluid pressure force acting on the sylphon, whereupon the spring 28 will restore the piston valve 31 to its neutral or cut-off position.

On the other hand, if there is an increase in load on the turbine, bringing about a slight reduction in speed, the impeller pressure will decline slightly and, as a consequence, the spring 28 will cause downward movement of the piston valve 31, thereby placing the secondary pressure supply passage 34 in communication with the pressure supply passage 35 to increase the secondary pressure, the increased secondary pressure acting through the servo-motor apparatus, at 37, to increase the admission of steam to the turbine. Increase in secondary pressure in the line 34 brings about increase in the force of secondary pressure acting on the secondary piston face 38 until it compensates for the reduction in primary force acting on the sylphon so that the piston valve is caused to move upwardly until it is restored to a neutral or cut-off position.

In order to make the transformer governor highly sensitive to large rates of change of load, the secondary pressure is not applied directly at its full value at all times to the secondary piston face 38 but it is modified or controlled in the manner now to be described. A passage 40 affords communication between the secondary passage 34 and the expansible chamber or space 41 below the secondary piston area 38, the passage including an orifice 42, preferably provided by an adjustable needle valve 43. An accumulator or air chamber 44 is provided for the expansible chamber or space 41. Thus, it will be seen that the orifice 42 normally prevents violent fluctuations in secondary pressure and consequent hunting. Also, the adjustable orifice and the air chamber or accumulator cooperate to provide means making the governor anticipatory of rapid load changes, as more fully disclosed and claimed in my application aforesaid.

The back pressure regulator, at 18, utilizes back pressure steam supplied through the connection 46 as the primary pressure medium to provide a medium under secondary or transformed pressure supplied by the line 47 to the transformer governor, the line 47 preferably being connected so as to apply fluid under pressure to the sylphon abutment 23 in opposition to the primary fluid pressure applied thereto.

Referring now to the back pressure regulator, at 18, and to Fig. 2, there is shown a housing structure 48 defining upper and lower chambers 49 and 50 separated by an intermediate wall 51, the upper and lower chambers having upper and lower walls 53 and 54, respectively.

The intermediate wall 51 is provided with a cylinder 55 having pressure supply and exhaust ports 56 and 57, respectively, and with a secondary or transformed pressure supply port 58 arranged between the ports 56 and 57. The port 56 communicates with a passage 56a connected to the conduit 56b supplied with fluid under pressure from the impeller of the pressure-producing means, at 25. The spinner piston valve 59 is disposed in the cylinder and it is provided with piston portions 60 and 61 normally lapping the pressure supply and exhaust ports 56 and 57, respectively. It will be apparent that, if the piston valve is moved upwardly, the secondary pressure supply port 58 and the secondary pressure supply line 47 are placed in communication with the pressure supply port 56, whereby the secondary pressure is increased. On the other hand, if the piston valve is moved downwardly, the secondary pressure supply port 58 is placed in communication with the exhaust port 57, whereby the secondary pressure is reduced.

Referring now to the means for moving the piston valve 59 axially in opposite directions, in the upper chamber 49 there is shown a sylphon 62 arranged in a chamber provided by the body 63 attached to the upper wall 53, the lower end of the sylphon being attached to the inwardly-extending flange 64 of the body. The upper end of the sylphon is closed by an abutment 65 which bears against the pointed end 66 of a stem 67 of the abutment construction or cup 68, which has point bearing connection with respect to the upper pointed end 69 of the piston valve 59. A spring 70 is arranged in the upper chamber or compartment 49, the upper end of the spring bearing against an outwardly-extending flange 71 provided on the abutment structure 68 and the lower end of the spring being carried by abutment ring 71 supported in a vertically adjustable manner by the intermediate wall structure 51. By adjusting the ring 71 upwardly or downwardly, the proper relation of the spring force acting on the abutment structure 68 in opposition to the primary or back pressure steam force acting on the primary piston area of the sylphon may be secured.

The lower end of the piston valve extends below the intermediate wall structure 51 and it has a lower pointed end 72 engaging an abutment 73 carried by the upper end of the loading spring 74, the lower end of the latter spring being supported by an abutment 75 carried by the adjustable stem 76 threaded to the lower wall 54 and accessible externally so that the force of the spring 74 may be varied. A sylphon 77 is disposed about the stem 76 and seals the threaded connection of the latter from the interior of the lower chamber 50. Any tendency of the upper abutment to turn is resisted by the spring means at 78, such means providing for such small amount of give as may be desirable in the operation of the apparatus.

From the foregoing description, it will be apparent that the piston valve 59 is acted upon by the difference of forces of the prime mover or back pressure steam and of the upper spring 70 and by the force of the lower spring 74. In addition, the piston valve is acted upon by fluid under pressure coming from the secondary supply passage and ports 58 and 47. To this end, the piston valve has an upwardly facing secondary piston area 79 supplied with fluid under pressure by the passage 79' communicating with the secondary pressure or supply passage through an orifice 80, preferably adjustable, for example, by means of a needle valve 81. As already pointed out in connection with the transformer governor, an air chamber or accumulator is also preferably associated with the passage 79' at the secondary piston area side of the orifice, such air chamber being shown at 82.

In order to avoid the effect of static friction on the piston valve, 59, the latter has continuous spinning motion imparted thereto preferably by turbine means. For example, I show a turbine rotor 83 having peripheral buckets 84 supplied with motive fluid by jet means 85 in communication with the high pressure supply line or source.

The lower wall 54 has connected thereto a drain passage 54a to conduct drainage back to the reservoir, as shown in Fig. 1.

If the steam pressure supplied by the line 46 should increase, then the downwardly acting primary force provided by the steam pressure acting on the primary piston area afforded by the sylphon 62 causes downward movement of the piston valve 59, thereby placing the secondary pressure port 58 and the secondary pressure passage 47 in communication with the exhaust ports 57 so as to reduce the secondary pressure. As the secondary pressure is reduced, the force thereof acting downwardly on the sylphon abutment of the transformer governor is reduced and consequently the latter operates to reduce the admission of steam to the turbine.

On the other hand, should the steam back pressure decrease slightly, the contrary operation will take place, the piston valve 59 moving upwardly to place the secondary pressure port 58 in communication with the supply pressure port 56, bringing about increase in secondary pressure; and the increased secondary pressure supplied by the line 47 to the transformer governor increases the effective force acting downwardly on the pilot valve of the transformer governor so that the secondary pressure supply passage of the latter is placed in communication with the pressure supply port to increase the secondary transformed pressure supplied to the servo-motor of the admission valve so that the latter are operated to increase the supply of steam to the turbine.

If the spinner piston valve 59 is moved downwardly due to an increase in steam pressure, it will be apparent that this downward movement is resisted both by the upper spring 70 and by the lower spring 74. Downward movement of the piston valve, as already pointed out, places the secondary pressure port 58 in communication with the exhaust port 48 with the result that the secondary pressure is reduced, and consequently the force of the secondary pressure applied to the secondary piston area 79 is reduced, thereby bringing about a reduction in the net downwardly acting forces acting on the piston valve; and, as soon as the force of the secondary pressure acting on the secondary piston area or face 79 is sufficiently reduced to compensate for the increased primary pressure force of steam acting on the sylphon, then the springs restore the piston valve to neutral cut-off position. On the other hand, if the primary pressure force acting on the sylphon should decrease, then the upper and lower springs are effective to provide for movement of the piston valve 59 upwardly, thereby placing the secondary pressure supply port 58 in communication with the high pressure port 56 to increase the secondary pressure; but, as the secondary pressure increases, the effect thereof acting on the secondary piston face 79 also increases, and, as already pointed out, the secondary pressure will continue to increase until such time as the force thereof acting through the secondary piston face area 79 on the piston valve in a downward direction compensates for the decreased primary steam pressure force acting in the same direction, whereupon the piston valve will be restored to neutral cut-off position.

The orifice 80 and the air chamber 82 of the back pressure regulator provide for controlling impulses in response to sudden changes in process or heating demand. If there is a sudden increase in heating or process load, then the secondary pressure supplied from the back pressure regulator to the transformer governor is so increased that steam will be admitted to the turbine instantaneously at a rate in excess of the requirements, the apparatus then functioning to bring about restriction as the new demand is met. On the other hand, with a sudden decrease in heating or process load, the contrary operation takes place, steam to the turbine being restricted more rapidly than required for the new demand, so that the proper amount of steam for the new demand will be rapidly reached.

The lower loading spring 74 provides for the establishment of a pressure carried continuously by the transformer governor, at 16, regardless of whether or not the back-pressure regulator, at 18, is in operation. When the back-pressure regulator is cut out, the valve 88 in the steam line 46 is closed, and thereupon the transformed pressure in the line 47 going to the transformer governor, at 16, is maintained constant by the loading spring 74. In operation, when the sylphon abutment 68 contacts with the upper end of the spinner 59, from then on any increase in steam pressure (back pressure supplied by the line 46) causes, through the intermediary of the transformer governor, at 16, movement of the governor valve or valves 15 in a closing direction. Normally, the spring 74 is loaded so that, after closing of the back-pressure steam valve, it will still provide a suitable transformed pressure, for example, a pressure of about 5 pounds, in the line 47 going to the transformer governor.

The loading spring 74 also provides a means for testing the emergency governor equipment. To this end, it will be seen that the abutment 75 is connected to the upper end of the stem 76 having connected thereto a hand wheel 90. Assuming that the turbine is operating normally and it is desired to test the auto-stop, then the lock nut 91 is released and the hand wheel is turned so as to slowly increase the compression force of the spring 74, increase in the spring force resulting in increase in turbine speed. The hand wheel 90 is adjustably connected to the lower end of the stem 89 in such a manner that when it abuts with the lower face of the lock or jam nut 91, the force of the spring 74 will be such as to bring about an increase in turbine speed of not to exceed 15%. Should this operation result in tripping of the emergency governor equipment, then this is an indication of such equipment being in good order; on the other hand, if tripping does not occur, the contrary is thereby indicated.

Thus, it will be seen that the apparatus is anticipatory in character, that is, it anticipates a change in load, this feature or characteristic being due to the fact that it responds to the rate of change of load demand rather than to the magnitude of change. If there is a rate of change in either direction, this brings about either an excess supply of steam to the turbine or a reduced supply of steam thereto so as to bring about most rapidly steam conditions to suit the new demand, the apparatus operating to stabilize operation quickly for the predetermined back pressure at the new load or demand.

The anticipatory character of the back pressure regulator is especially advantageous where the steam consuming device or devices, indicated generally at 93 in Fig. 3, are located at a considerable distance from the source, for example, the steam turbine 10. If, in Fig. 3, the back pressure regulator were located at the exhaust end of the turbine 10, then, owing to the distance of the process or heating steam consuming devices, any change in process or heating load might result in undesired fluctuations in pressure and temperature in the connecting line before the regulator could be acted upon to change the admission of steam to the turbine. On the other hand, where the regulator is located at the process or heating device or devices, then it responds immediately to any tendency to change in pressure therein and transmits controlling pressure impulses to the transformer governor of the turbine so that steam is admitted appropriately to the turbine in accordance with the instantaneous heating or process demand. With a sudden change in heating or process demand, the regulator responds in an anticipatory manner before any substantial change in magnitude and steam is admitted to the turbine to meet the new condition, whereby control of pressure, and, therefore, of temperature, in the heating or process apparatus is maintained within very narrow limits with rapid changes in process or heating demand.

In the use of the apparatus so far described, there are applications where maintenance of back pressure is not so important because of inability of the boilers to take sudden steam demands. In such cases, the back pressure can still be maintained within small limits, but the apparatus will be arranged so that quick pressure changes will not be followed. To this end, in Fig. 4, there is shown an arrangement which is effective to secure this operation. In this view, the back-pressure regulator, at 18, has its transformed pressure line 47 provided with a needle valve 94 and an air bell or chamber 95 communicates with the line 47 between the needle valve 94 and the governor transformer, at 16. With this arrangement, it will be apparent that the regulator pressure will be balanced but that there is a time delay, owing to the needle valve and the air bell, between the action of the back pressure regulator and response of the governor.

In operation, fluid under primary and tertiary pressures is supplied by the conduits 26 and 47, respectively, connected to the speed-responsive, pressure-developing means, at 25, and to the back-pressure transformer, at 18, respectively, for action on primary and tertiary piston areas of the movable abutment 23. Also, the force of the spring 28 is applied to the abutment, the spring being arranged so that its force opposes at least one of the fluid pressure forces. As shown, the force of the spring and the force of the tertiary pressure act downwardly against the abutment and in opposition to the force of the primary pressure.

If the abutment 23 moves in consequence of change of any of these forces, the spinner piston valve 31 is moved to bring about variation in secondary or derived pressure supplied by the conduit 34 to the servo-motor, at 37, operatively connected to the steam admission valve means 15.

As already pointed out, the spinner piston valve 31 is provided with a secondary piston area, which is so disposed that pressure applied thereto tends to move the piston valve toward the abutment 23. If the abutment moves upwardly, pressure applied to the secondary piston area is effective to cause the spinner piston valve to follow the abutment.

Movement of the spinner piston valve brought about by relative variation of the forces applied to the abutment 23 induces change in secondary pressure, with the result that the force thereof applied to the secondary piston area changes; and the change of the latter force is in such a direction as to compensate for the relative variation of forces, initiating movement of the spinner piston valve, at which time the forces acting on the piston valve will be in equilibrium with the latter restored to neutral or cut-off position. Thus, it will be seen that, with changes in load, the secondary pressure changes, so that there is a secondary pressure range for the load range.

The range of secondary pressures is applied to the servo-motor, at 37, by means of the conduit 34 to secure adjustment of the admission valve means 15 suitably to the load.

The servo-motor, at 37, includes an operating cylinder 100 containing an operating piston 101 carried by the valve stem 102. Motive fluid is supplied to and exhausted from opposite sides of the piston by means of the pilot valve 103.

The pilot valve has its lower end connected to the upper end of a tension load spring 104 so arranged that the force thereof tends to pull the pilot valve downwardly. The pilot valve carries a piston abutment 105, which has its lower piston area subject to the secondary or transformed pressure so that the force thereof tends to move the piston valve upwardly against the force of the load spring.

The stem 102 is connected, by means of a follow-up lever 106, to the upper end of the pilot valve so that, with movement of the operating piston 101, in consequence of movement of the pilot valve, tends to restore the pilot valve to neutral, cut-off position.

The connection between the lever 106 and the pilot valve includes a tension scale spring 107.

In operation, assuming a change in secondary pressure, then the abutment 105 moves, moving the pilot valve and changing the force of the spring 104. Just as soon as the pilot valve moves from its intermediate cut-off position, the operating piston starts to move, but movement of the operating piston acts, through the follow-up lever 106, to bring about change in the force of the tension scale spring 107 acting on the pilot valve, and, when the change in the latter force is sufficient to compensate for the difference in forces causing initial movement of the pilot valve, then the latter is restored to neutral, or cut-off position. For example, if the secondary pressure increases incident to load increase, the piston valve 103 moves upwardly, resulting in upward movement of the operating piston, and upward movement of the latter, acting through the follow-up lever 106, causes reduction in load of the tension scale spring 107, with the result that the force of the latter acting on the pilot valve 103 is diminished, and, as soon as the latter force is diminished to such an extent as to compensate for the increase in force due to secondary pressure, then the load spring is effective to pull the pilot valve 103 downwardly to neutral position.

Under full load condition, the operating piston will be in its upper position with the connected valve wide open, the force of the tension scale spring 107 acting on the pilot valve will be a minimum and the force of the secondary pressure acting on the secondary piston area of the abutment 105 will be a maximum. On the other hand, under no load condition, the force of the secondary pressure will be a minimum and the force of the scale spring will be a maximum. Hence, there is a range of secondary pressures developed by the apparatus corresponding to the load range and the servo-motor apparatus incorporates pressure responsive means operative in response to the derived or secondary pressure range to secure admission of steam appropriate to the load.

From the foregoing, it will be apparent that I have devised a back-pressure regulator of the pressure transformer type for mod'fying the admission of steam to a turbine so as to maintain the back pressure substantially constant, or within very small limits of variation. The regulator is of anticipatory character, that is, it is responsive to the rate of demand so that lag is minimized and change in admission of steam is rapidly effected to meet changes in demand. Also, the regulator is so arranged, with respect to the prime mover or turbine and the steam consuming device supplied by the turbine, that wide fluctuations in temperature and pressure of steam supplied to the consuming device are minimized, this result being due to the fact that the regulator is of the pressure transformer type, is, therefore, highly sensitive, and is located closely adjacent to the consuming device so that a change in demand of the consuming device is quickly translated into a pressure impulse, which is transmitted to the main governor to secure such admission of steam to the turbine as to meet the changed demand on the part of the consuming device. The mechanism and arrangement of the back-pressure regulator provide for highly sensitive operation and response, these things being due to the fact that the piston valve is carried by a spinner and to the fact that the valve acts in response to back pressure to transform fluid derived from a source of suitably high pressure into a controlling or transformed pressure for application to the main governor to secure adjustment of the latter in order to obtain the required steam admission to the turbine. The transformer makes it possible for a narrow range of change in back pressure to secure any desired range of transformed pressure, the transformed pressure at all times bearing definite proportionate relation to the back pressure. Hence, a very slight change in back pressure is immediately detected by the transformer and appropriately changed or magnified to secure adjustment of the steam admission rate in order to cope with the changing consumer demand with a minimum of lag. In addition, the back pressure transformer is capable of being so operated as to secure rather easy testing of the emergency governor equipment.

While I have shown my invention in several forms, it will be obvious to those skilled in the art that it is not so limited, but is susceptible of various other changes and modifications, without departing from the spirit thereof, and I desire, therefore, that only such limitation shall be placed thereupon as are imposed by the prior art or as are specifically set forth in the appended claims.

What I claim is:

1. In a pressure regulator, a cylinder having a fluid pressure inlet port, a fluid pressure outlet port, and an exhaust connection; a piston valve for controlling communication of the pressure outlet port with the pressure inlet port or with the exhaust connection; means for imparting spinning motion to the piston valve; a pressure responsive device; a thrust bearing between the pressure responsive device and one end of the piston valve; spring means opposing the pressure responsive device; and means responsive to change in outlet pressure due to movement of the piston valve in consequence of disturbance of the equilibrium of forces acting thereon to restore the piston valve to neutral cut-off position with the forces acting thereon in equilibrium and including a piston area on said piston valve and means for applying outlet pressure to said piston area.

2. In a pressure regulator, a cylinder having a fluid pressure inlet port, a fluid pressure outlet port, and an exhaust connection; a piston valve for controlling communication of the pressure outlet port with the pressure inlet port or with the exhaust connection; a pressure responsive device; a thrust bearing between the pressure responsive device and one end of the piston valve; said pressure responsive device tending to move the piston valve in such a direction as to establish communication of the pressure outlet port with the exhaust connection; spring means opposing the pressure responsive device and providing for movement of the piston valve in a direction to establish communication of the pressure outlet port with the pressure inlet port; said piston valve having a piston area facing toward the pressure responsive device; means for applying outlet pressure to said piston area; and means for imparting spinning motion to the piston valve.

3. In a pressure regulator, a cylinder having a fluid pressure inlet port, a fluid pressure outlet port, and an exhaust connection; a piston valve for controlling communication of the pressure outlet port with the pressure inlet port or with the exhaust connection; means for imparting spinning motion to the piston valve; a pressure-responsive device; a thrust bearing between the pressure-responsive device and one end of the piston valve; said pressure responsive device tending to move the piston valve in such a direction as to establish communication of the pressure outlet port with the exhaust connection; spring means opposing the pressure-responsive device and providing for movement of the piston valve in a direction to establish communication of the pressure outlet port with the pressure inlet port; said piston valve having a piston area facing toward the pressure responsive device; a passage for supplying fluid under outlet pressure to said piston area and including an orifice; and an accumulator communicating with said passage at the piston area side of the orifice.

4. In a pressure regulator, a cylinder having a fluid pressure inlet port, a fluid pressure outlet port, and an exhaust connection; a piston valve for controlling communication of the pressure outlet port with the pressure inlet port or with the exhaust connection; means for imparting spinning motion to the piston valve; a pressure-responsive device; abutment means including a thrust bearing between said device and one end of the piston valve and serving to transmit movement of the pressure-responsive device to the piston valve in such a direction as to establish communication of the pressure outlet port with the exhaust connection; first and second spring means opposing the pressure-responsive device and providing for movement of the piston valve in a direction to establish communication of the pressure outlet port with the pressure inlet port; an abutment engaged by the second spring means; a thrust bearing between the abutment and the other end of the piston valve; means providing for adjustment of the second spring means; said piston valve having a piston area facing toward the pressure-responsive device; and a passage for supplying fluid from the outlet pressure connection to said piston area.

5. In a pressure regulator, a housing having upper and lower chambers with a separating wall; a cylinder carried by said wall and having a fluid pressure inlet connection, a fluid pressure outlet connection, and an exhaust connection; a piston valve for controlling communication of the pressure outlet connection with the pressure inlet connection or with the exhaust connection; said piston valve having its ends protruding beyond the ends of the cylinder; a pressure-responsive device in the upper chamber; abutment means including a thrust bearing between the pressure responsive device and the adjacent end of the piston valve; a first spring in the upper chamber, supported by said wall, and opposing the pressure-responsive device; turbine means in the lower chamber and including a rotor element carried by the piston valve for imparting spinning motion to the latter; an abutment arranged in the lower chamber; a thrust bearing between the last-named abutment and the adjacent end of the piston valve; a second spring in the second chamber and having one end engaging said abutment; a second abutment arranged in the lower chamber and engaging the other end of the second spring; means for varying the position of the second abutment to secure variation in the force of the second spring; said piston valve normally occupying a neutral cut-off position with the forces acting thereon in equilibrium; and means responsive to change in outlet pressure in consequence of movement of the piston valve due to change in the force of the pressure-responsive device to restore the piston valve to neutral cut-off position with the forces acting thereon in equilibrium.

6. The combination with a turbine having an admission valve and governor connected thereto, of a back pressure regulator for applying controlling force to the governor including a passage for supplying fluid under transformed pressure to the governor, a source of fluid under pressure, an exhaust connection, a piston valve for placing said transformed pressure supply passage in communication either with said source or with the exhaust connection, means providing primary and secondary piston areas for said valve, means for applying back pressure steam to act on the primary piston area, a spring opposing the force of the steam pressure applied to the primary piston area, and means for subjecting the secondary piston area to said transformed pressure.

7. The combination with a turbine having an admission valve and a governor connected thereto, of a pressure transformer including a cylinder having pressure supply, exhaust and secondary pressure ports; means for supplying fluid under pressure to the supply port; a passage connected to the secondary pressure port for supplying fluid under secondary pressure to the governor to exert a controlling effect on the latter; a piston valve in the cylinder and cooperating with the ports so that movement of the valve in one direction places the secondary pressure port in communication with the pressure supply port and movement in the other direction places it in communication with the exhaust port, whereby secondary pressure is provided; and means for moving the piston valve including primary and secondary piston areas, adjustable spring means opposing at least one of the piston areas, means for applying back pressure steam as primary pressure to the primary piston area, and means for applying secondary pressure to the secondary piston area.

8. The combination with a turbine having an admission valve and a governor connected thereto, of a pressure transformer including a cylinder having pressure supply, exhaust and secondary pressure ports; means for supplying fluid under pressure to the supply port; a passage connected to the secondary pressure port for supplying fluid under secondary pressure to the governor to exert a controlling effect on the latter; a piston valve in the cylinder and cooperating with the ports so that movement of the valve in one direction places the secondary pressure port in communication with the pressure supply port and movement in the other direction places it in communication with the exhaust port, whereby secondary pressure is provided; means for moving the piston valve including a sylphon providing a primary piston area and having abutting relation with respect to one end of the piston valve, means for applying back pressure steam as primary pressure on the sylphon to exert force on the piston valve, a spring exerting its force in opposition to the steam pressure force applied to the sylphon, means providing a secondary piston area for the piston valve, and means for applying secondary pressure to the secondary piston face to exert a secondary pressure force on the valve; and means for imparting a spinning motion to the piston valve.

9. The combination with a turbine having an admission valve and a governor connected thereto, of a pressure transformer including a cylinder having pressure supply, exhaust and secondary pressure ports; means for supplying fluid under pressure to the supply port; a passage connected to the secondary pressure port for supplying fluid under secondary pressure to the governor to exert a controlling effect on the latter; a piston valve in the cylinder and cooperating with the ports so that movement of the valve in one direction places the secondary pressure port in communication with the pressure supply port and movement in the other direction places it in communication with the exhaust port, whereby secondary pressure is provided; means for moving the piston valve including a sylphon providing a primary piston area, abutment means between the sylphon and one end of the piston valve including a thrust bearing, means for applying back pressure steam to the sylphon so as to act on said primary piston area, a spring exerting its force in opposition to that of the steam pressure applied to the primary piston area, means providing a secondary piston face on the piston valve and facing in such a direction that pressure applied thereto exerts a force on the piston valve in the same direction as that exerted by the primary piston area of the sylphon, means providing an expansible chamber for the secondary piston face, an air chamber in communication with the expansible chamber, a passage including an orifice affording communication between the secondary passage and the expansible chamber, a second spring, and abutment means between the second spring and the valve including a thrust bearing, said second spring being arranged so that its force is exerted on the piston valve in opposition to the fluid pressure forces applied thereto; and means for imparting spinning motion to the piston valve.

10. The combination as claimed in claim 9 with means for adjusting the effective force of the second spring.

11. The combination as claimed in claim 9 with means providing for adjustment of the forces of the first and second springs.

12. The combination with a turbine having an admission valve and a governor connected thereto, of a back pressure regulator for applying controlling force to the governor including fluid pressure supply means, a passage for supplying fluid under secondary pressure to the governor, an exhaust connection, a piston valve for placing the secondary pressure supply passage in communication either with said fluid pressure supply means or with the exhaust connection, means providing primary and secondary piston areas for said piston valve, means for applying back pressure steam to the primary piston area, means for subjecting the secondary piston area to the effect of the fluid under secondary pressure including a passage provided with an orifice, accumulator means in communication with said passage at the secondary piston area side of the orifice, and spring means exerting its force in opposition at least to one of said fluid pressure forces.

13. The combination with a turbine having an admission valve and a governor connected thereto, of a back pressure regulator for applying fluid under secondary pressure to the governor and including fluid pressure supply means, a passage for supplying fluid under secondary pressure to the governor, an exhaust connection, a piston valve for placing the secondary pressure supply passage in communication either with said pressure supply means or with the exhaust connection, means providing primary and secondary piston areas for the piston valve and facing in the same direction, means for supplying back pressure steam to the primary piston area, means for applying fluid under secondary pressure to the secondary piston area including a passage provided with an orifice, accumulator means in communication with the last-named passage at the secondary piston area side of the orifice, spring means acting in opposition to the fluid pressure forces, and means for imparting spinning motion to the piston valve.

14. The combination with a turbine having an admission valve and a governor connected thereto, of a pressure transformer including a housing having first and second end walls and an intermediate wall; a cylinder carried by the intermediate wall and having a pressure port, an exhaust port, and a secondary pressure supply port disposed between the pressure and exhaust ports, the pressure and exhaust ports being disposed, respectively, adjacent to the first and second end walls; means for supplying fluid under pressure to the pressure port; a passage connected to the secondary pressure port for supplying fluid under secondary pressure to said governor to exert a controlling effect on the latter; a piston valve in the cylinder and movable axially in opposite directions to place the secondary pressure supply port in communication either with the pressure port or with the exhaust port to provide fluid under secondary pressure; means including a sylphon cooperating with the first wall to define a steam chamber; means for supplying steam under back pressure to the steam chamber; abutment means between the sylphon and the end of the piston valve adjacent thereto and including a thrust bearing; a first spring acting on the sylphon in opposition to the steam pressure so that the difference between the spring and back pressure steam forces applied to the sylphon is exerted on the piston valve; a secondary piston face on the piston valve and facing in such a direction that secondary pressure applied thereto exerts a force on the piston valve in the same direction as that exerted by the sylphon; means for supplying fluid under secondary pressure to the secondary piston face; means for imparting spinning motion to the piston valve to avoid static friction; a second spring; abutment means between one end of the second spring and the other end of the piston valve and including a thrust bearing; and abutment means engaging the other end of the second spring and carried by the second wall and including means providing for adjustment of the second spring.

15. The combination with a turbine having an admission valve and a governor connected thereto, of a pressure transformer including a housing having upper and lower chambers separated by an intermediate wall; a cylinder carried by the intermediate wall and having a pressure port, an exhaust port, and a secondary pressure supply port disposed between the pressure and exhaust ports, the pressure and exhaust ports being disposed, respectively, adjacent to the upper and lower chambers; fluid pressure supply means in communication with the pressure port; a passage connected to the secondary pressure port for supplying fluid under secondary pressure to said governor to exert a controlling effect on the latter; a piston valve in the cylinder and movable axially in opposite directions to place the secondary pressure supply port in communication either with the pressure port or with the exhaust port to provide fluid under secondary pressure; a sylphon arranged in the upper chamber; means for supplying steam under back pressure to the sylphon; abutment means between the sylphon and the upper end of the piston valve and including a thrust bearing; a first spring acting on the sylphon in opposition to the steam pressure applied thereto so that the difference between the spring and steam pressure forces is exerted on the piston valve; a secondary piston face on the piston valve and facing in such a direction that secondary pressure applied thereto exerts a force on the piston valve in the same direction as that exerted thereon by the sylphon; means for supplying fluid from said secondary passage to the secondary piston face and including a passage provided with an adjustable orifice; accumulator means in communication with said last-named passage at the secondary piston area side of the orifice; means for imparting spinning motion to the piston valve to avoid static friction; a second spring in the lower compartment; abutment means between the upper end of the second spring and the lower end of the piston valve and including a thrust bearing; an abutment in the lower compartment engaging the lower end of the second spring; means for supporting the last-named abutment from the lower wall of the lower compartment including threaded means extending through said lower wall and providing for adjustment of the abutment to vary the force of the second spring; a bellows seal encompassing the abutment supporting means and having its ends attached to the abutment and to the lower wall of the lower compartment; and a drain connection for said lower compartment.

16. The combination with a turbine having an exhaust line supplying steam to a consuming device, said turbine having an admission valve controlled by a governor provided with a pressure responsive control device, of a back-pressure regulator associated with the consuming device and including a transformer responsive to pressure in said device normally to derive a proportionate fluid pressure from a suitable source, means for supplying the derived pressure to the governor pressure-responsive device to secure admission of steam in accordance with the demand of the consuming device, and means responsive to exceeding a predetermined rate of change of demand in said consuming device in either direction to supply instantaneously disproportionately larger or smaller derived pressure, as the case may be, to control the governor pressure responsive device to secure admission of steam to quickly meet the new demand.

17. The combination with a turbine supplying steam to a consuming device located at a distance therefrom, the turbine having an admission valve controlled by a governor having a pressure responsive control device; of a back pressure regulator located contiguous to the consuming device and including a cylinder having pressure inlet, exhaust, and secondary pressure ports; means for supplying fluid under pressure to the inlet port; a piston valve in the cylinder; said piston valve being movable in one direction to establish communication between the secondary pressure supply and the pressure inlet ports and movable in the other direction to establish communication between the secondary pressure supply and exhaust ports; a passage connecting the secondary pressure port and the governor pressure responsive device; and means for moving the piston valve in opposite directions including primary and secondary piston areas, means for subjecting the primary piston area to steam at consuming device pressure, means providing an expansible chamber for the secondary pressure area, an air chamber in communication with the expansible chamber, and a passage including an orifice affording communication between the expansible chamber and the secondary pressure supply passage.

18. The combination with a turbine supplying steam to a consumer and having main and emergency governors, of a back-pressure regulator responsive to steam pressure of said consumer for applying a controlling fluid pressure to the main governor in such manner that the latter is operated to secure admission of steam to the turbine so as to maintain the consumer pressure substantially constant, said back pressure regulator including a pressure transformer for transforming pressure of fluid derived from a source of suitably high pressure into said controlling fluid pressure for application to the main governor, controlling devices for the transformer including means responsive to consumer steam pressure and opposing spring means, first means for varying the force of the spring means, and second means having a predetermined range of adjustment with respect to the first means so that the force of the spring means may be varied to bring about such change in transformed or controlling pressure that the main governor is operated to secure admission of steam to the turbine to overspeed the latter not to exceed a predetermined extent in order to test the operativeness of the emergency governor.

19. The combination with a turbine supplying steam to a consuming device located at a distance therefrom, the turbine including an admission valve controlled by a governor having a pressure-responsive device, of a pressure transformer located adjacent to the consuming device and utilizing the steam pressure of the latter to secure a derived and proportionate fluid pressure, a conduit for transmitting the derived fluid pressure to the governor pressure responsive device, and means associated with the conduit to damp pressure pulsations so that the governor is operated to meet the consuming device demand without being influenced by pressure pulsations due to demand fluctuations.

20. The combination with a turbine supplying steam to a consuming device located at a distance therefrom, the turbine including admission valve means controlled by a governor having a pressure responsive device, of a pressure transformer located adjacent to the consuming device and utilizing steam pressure of the latter to secure a derived and proportionate fluid pressure, a conduit for transmitting the derived fluid pressure to the governor pressure responsive device, an orifice in the conduit, and an accumulator communicating with the conduit between the orifice and the governor pressure responsive device.

21. The combination with a back pressure turbine having admission valve means, of pressure responsive means for controlling the admission valve means, means providing fluid under pressure which depends upon the turbine speed, means providing fluid under pressure dependent upon the back pressure, a pressure transformer responsive to both of said pressures to secure a derived pressure, and a passage for transmitting the derived pressure to the pressure responsive means.

22. The combination with a turbine supplying steam to a consuming device and having admission valve means, of a servo-motor for opening and closing the admission valve means and including a pilot valve, means responsive to a range of pressures to actuate the pilot valve for operation of the servo-motor to open or to close the admission valve means to the extent required by the load, means providing a first fluid pressure which depends upon the turbine speed, means providing a second fluid pressure which depends upon the pressure of steam supplied to the consuming device, a transformer responsive to said first and second pressures to secure a derived pressure such that the latter has a pressure range for the load range suitable for said pressure-responsive means, and a passage for transmitting derived pressure to the pressure responsive means.

23. The combination with a turbine having admission valve means and a consuming device supplied with steam by the turbine, of pressure-responsive means for controlling the admission valve means; means providing a primary pressure which depends upon the turbine speed; means providing a tertiary pressure depending upon the pressure of steam supplied to the consuming device; an abutment having primary and tertiary piston areas; means for applying primary and tertiary fluid pressures to the primary and tertiary piston areas; a spring exerting its force on the abutment in opposition to one at least of the fluid pressures; a cylinder having an inlet port supplied with fluid under pressure, an exhaust connection, and a secondary pressure supply port; a passage for connecting the secondary pressure supply port to said pressure-responsive means; a piston valve for controlling communication of the secondary pressure port either with the inlet port or with the exhaust connection; a secondary piston area on the piston valve and disposed so that pressure exerted thereon tends to move the valve toward the abutment; means for supplying fluid under transformed or secondary pressure to the secondary piston area; a thrust bearing between the piston valve and the abutment; and means for imparting spinning motion to the piston valve.

ANTHONY F. SCHWENDNER.